April 9, 1929. W. F. BRITTON 1,708,866
HEADLIGHT SHIELD
Filed Feb. 28, 1928
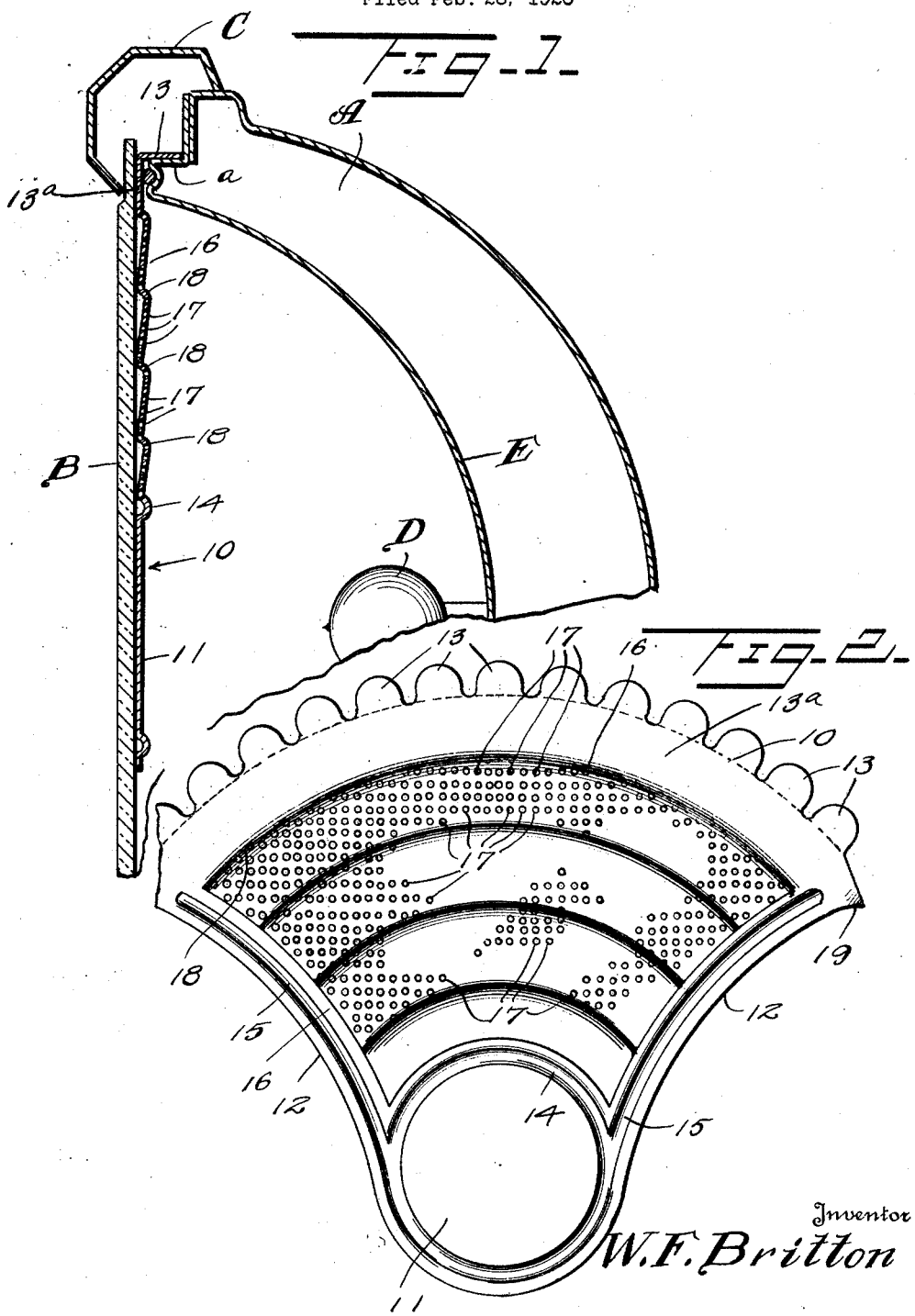

Patented Apr. 9, 1929.

1,708,866

UNITED STATES PATENT OFFICE.

WALTER FRANK BRITTON, OF ANNISTON, ALABAMA, ASSIGNOR TO INTERSTATE ROOFING & FOUNDRY CO., A CORPORATION OF ALABAMA.

HEADLIGHT SHIELD.

Application filed February 28, 1928. Serial No. 257,659.

This invention relates to headlight shields designed for the purpose of intercepting the upwardly directed rays of light from headlights so as to prevent the driver of an approaching car from being blinded by headlights.

The general object of this invention is to provide a very simple device for this purpose which may be readily put in place upon any ordinary headlight, which will intercept direct rays proceeding from the light bulb and intercept any upwardly directed rays.

A further object is to so construct this shield that it will prevent the back reflection from the rear window of a car being driven in front of a car equipped with my shield.

Another object is to provide a device of this character which will permit a diffused light to be transmitted through the upper portion of the headlight lens so that no shadow will be cast upon the road.

My invention is illustrated in the accompanying drawing, wherein:—

Figure 1 is a fragmentary sectional view of a headlight housing with my invention applied thereto and shown in section;

Figure 2 is a face or plan view of the device one corner of it being broken away.

Referring to this drawing, 10 designates the shield which may be made of metal, such as aluminum, celluloid or any other suitable sufficiently stiff material. Preferably, however, it will be made of sheet tin or copper. This shield is approximately sector-shaped. The inner portion of the shield is circular, as at 11, and relatively narrow so as to be disposed immediately in front of the bulb of a headlight or other lamp. The shield from this point flares outward laterally on each side, the side edges 12 of this flaring portion being concavely curved. The upper margin of the shield is convoluted to provide a series of lugs 13 adapted to be bent over to engage over the margin of the headlight housing A.

The circular portion 11 is preferably surrounded by a raised rib 14 stamped out of the thin metal and from this annular rib 14 there extends the two stiffening beads 15 which extend outward and laterally parallel to the edges 12. Inward of these stiffening beads, a fan-shaped or sector-shaped space is formed, designated generally 16, which is perforated throughout its entire extent by fine perforations 17, except for the upper arcuate margin 13ª which extends across this space. It will be seen that the spaces between these corrugations 18 are outwardly and upwardly deflected or disposed at an outward and upward angle to the general plane of the shield.

In the use of this device, the shield is disposed behind the upper portion of the headlight lens B and the lugs 13 are bent over so as to extend over the rim a of the headlight housing between this headlight housing and the lamp rim C. Under these circumstances, the opaque, disk-like portion 11 will be disposed immediately in front of the light bulb D and thus will prevent the direct rays of light from the lamp bulb from striking the eyes of an oncoming driver. The perforated area 16 will allow a certain amount of light to pass through so that the device will not cast a shadow on the road. This shield prevents the upward flare of light from the headlight and deflects the direct rays along the road at a height of not more than three and a half feet above the road surface for a distance of seventy-five feet. By the use of this device, the rays are deflected to the bottom of the reflector E of the headlight and thrown out on a straight level line in such manner that the driver of an approaching car will not be blinded by the headlights.

It will be seen that this device is very simple, that it is strong, easily applied, and that it permits a diffused light to be cast from the upper portion of the lamp but that it cuts off the direct rays or upwardly directed rays from the lamp. By transversely corrugating the area 16, a greater rigidity is secured which prevents any tendency to buckle and the thin metal of which the shield is constructed is further rigidified by the beads or corrugations 14 and 15. Attention is called to the fact that the ends of the arcuate margin 13ª terminate in slightly bent sharp corners 19 which press into the packing of the headlight and prevent the slipping of the device toward either right or left.

I claim:—

A shield for headlights, sector-shaped in form and having lugs on its curved margin adapted to be bent at right angles and engage the margin of a lamp housing, the shield being formed with two convergent concavely curved side edges and the lower portion of the shield being circular and imperforate, the area between the arcuate margin of the shield and said imperforate being minutely perforated to permit the passage of the diffused light, said area being corrugated to form a plurality of zones concentric to the curved margin, each of said zones being inwardly inclined and toward the curved margin and merging into the next zone by a narrow connecting portion.

In testimony whereof I hereunto affix my signature.

WALTER FRANK BRITTON.